March 31, 1970   M. J. MYLES ET AL   3,503,180

PACKAGING APPARATUS

Filed April 28, 1967   3 Sheets-Sheet 1

INVENTORS
MICHAEL J. MYLES
BY JOHN P. SPELLMAN
ATTORNEY

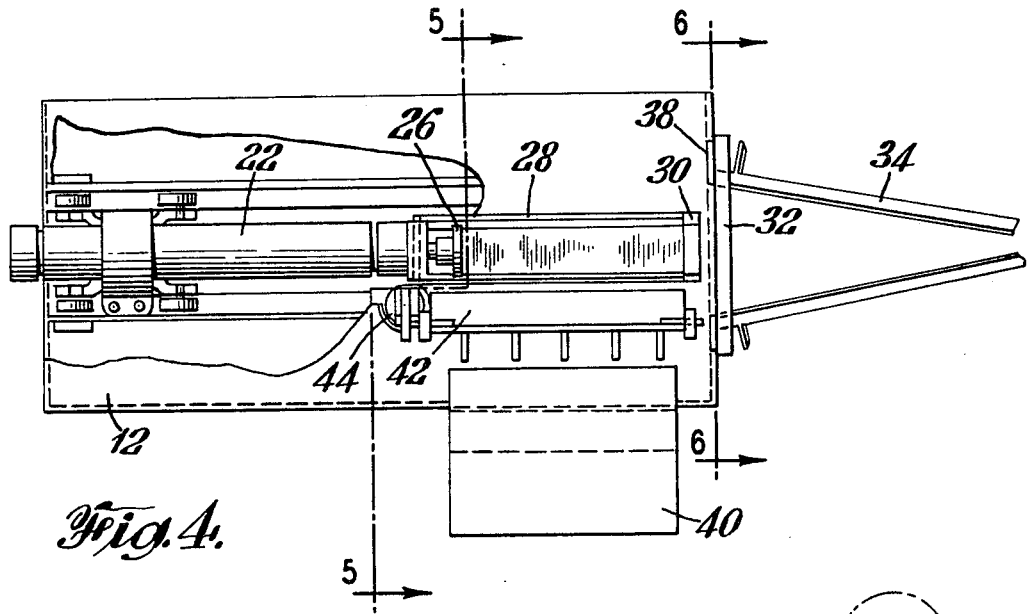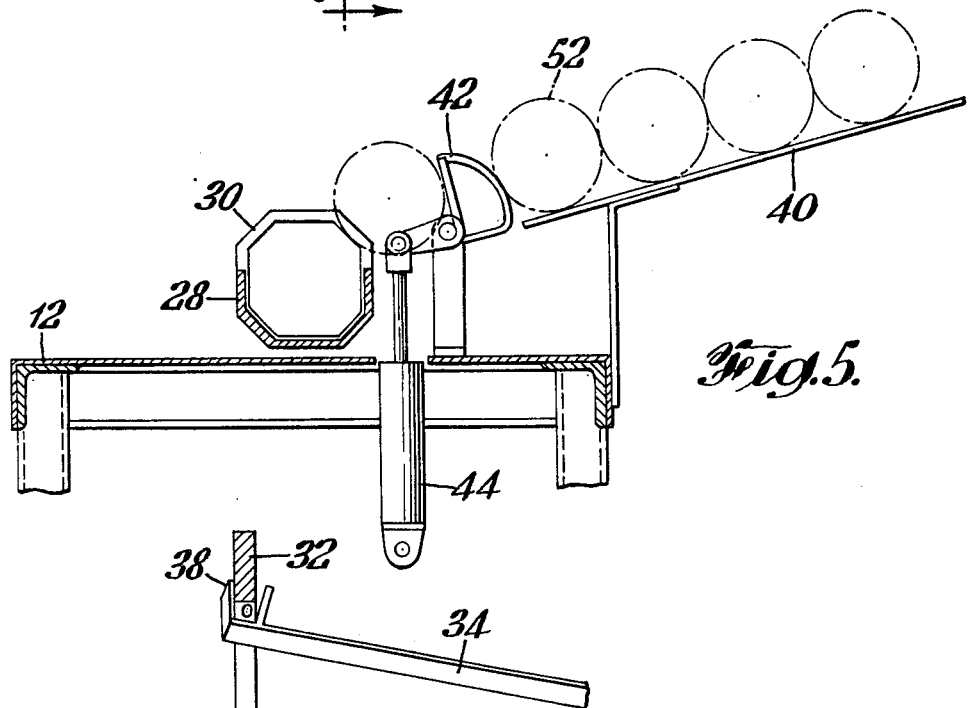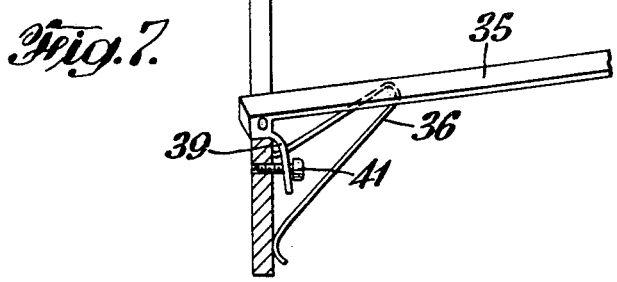

March 31, 1970  M. J. MYLES ET AL  3,503,180
PACKAGING APPARATUS
Filed April 28, 1967  3 Sheets-Sheet 3
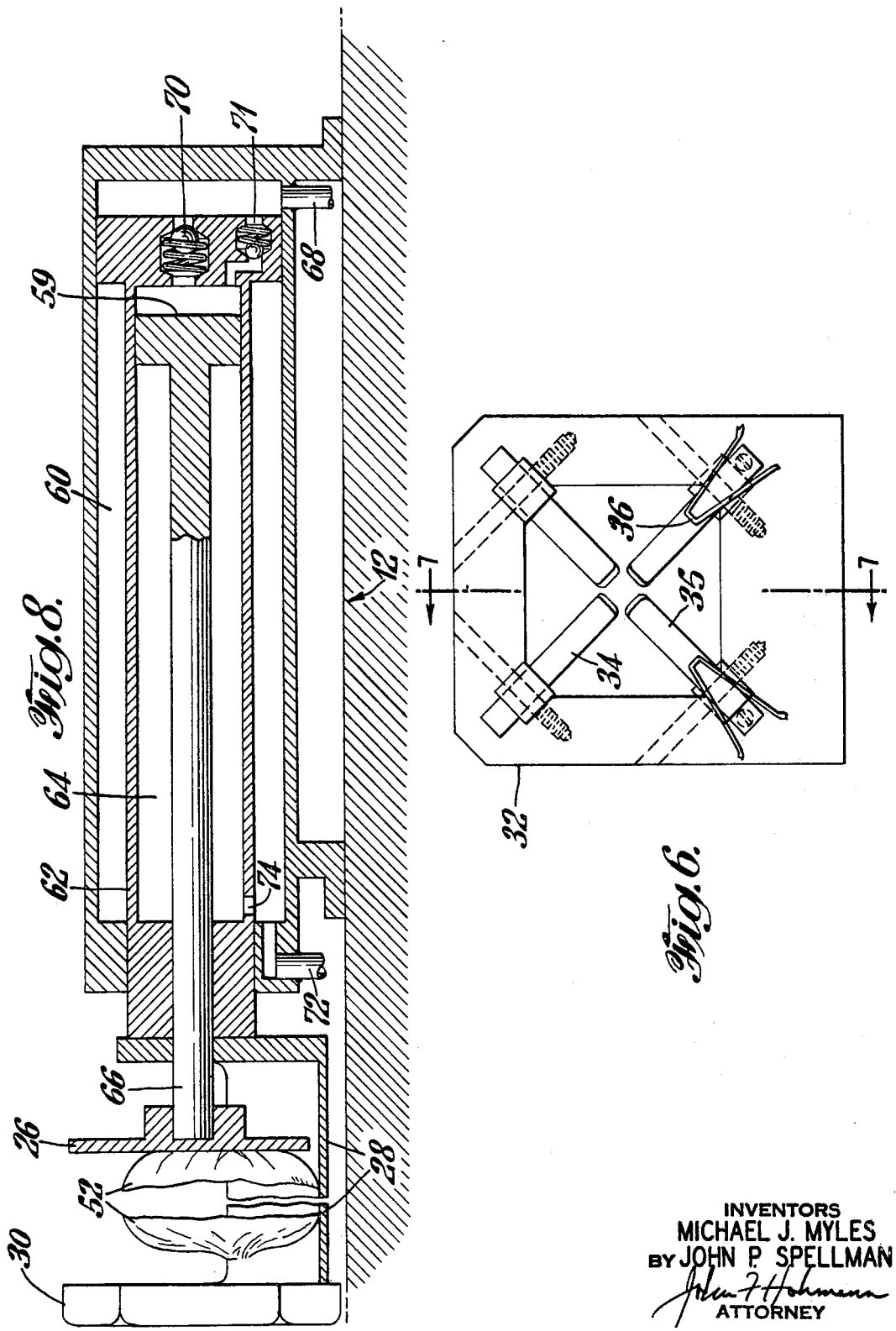
INVENTORS
MICHAEL J. MYLES
BY JOHN P. SPELLMAN
ATTORNEY

United States Patent Office

3,503,180
Patented Mar. 31, 1970

3,503,180
PACKAGING APPARATUS
Michael J. Myles, Downers Grove, and John P. Spellman, Oak Lawn, Ill., assignors to Union Carbide Corporation, a corporation of New York
Filed Apr. 28, 1967, Ser. No. 634,582
Int. Cl. B65b 5/00, 39/00
U.S. Cl. 53—258    11 Claims

ABSTRACT OF THE DISCLOSURE

Means are provided for opening elastic, plastic bags uniformly about their defined perimeters and along their lengths to facilitate the packaging therein of food items having varying sizes and shapes.

---

The present invention relates to a method and apparatus for packaging food items into elastic, plastic bags. More particularly, the present invention relates to a method and apparatus for packing food items having various sizes and shapes into elastic, plastic bags such that the plastic bag can be tensioned about the food item to form a closely adhering food wrapper for the encased food item.

The term "elastic, plastic bag" as used throughout this specification and in the appended claims, should be understood as referring to and including those bags obtained from materials which exhibit elasticity and which are commonly referred to in the art as "memory films." These memory films can be fabricated from a variety of plastic resins which, upon being processed and formed in films, exhibit the characteristic of being capable of being stretched to a dimension larger than the initial dimension of the film. Typical of the plastic materials which can be utilized to fabricate memory elastic films from which bags and pouches are formed, are such plastic materials as plasticized polyvinyl chloride, polyolefins, cellulosics, polyvinylidene chloride and the like.

Athough the present invention is described with particular reference to elastic, plastic bags it should be further understood that it can also be used with bags fabricated from film which can be stretched, distorted or otherwise opened to admit a food item therein including those bags fabricated from film which can be subsequently heat shrunk to provide a closely adhering food wrapper. Hence, the term "elastic, plastic bag" is intended and should be understood as including these types of bags as well.

When an object is placed in a stretched, elastic, plastic bag, the bag exhibits a tendency to return to its initial dimension when the stretching tension is relased. However, the object encased therein prevents the bag from returning completely to its initial dimension thereby causing the bag to adhere closely to the surface of the encased object.

In current commercial practice, elastic, plastic bags are commonly used to package and encase food items such as long sausages, meat loaves, hams, and the like, having varying sizes and shapes and which do not readily lend themselves to automatic or semi-automatic packaging. In the past, such food items have been packaged by hand, a method which is obsolete in view of today's commercial requirements for production, sanitation, shelf life and sales appearance of the packaged food item. In efforts to meet present commercial production requirements, several different types of apparatus have been introduced in attempts to package these food items automatically or semi-automatically. While these apparatus have met with some degree of success in eliminating some of the manual operations, they are not entirely satisfactory since they exhibit serious drawbacks affecting either the packaged food item or the manner in which the food item is packaged.

In the U.S. Patent 2,884,328 to Johnson, U.S. Patent 3,181,956 to Clark and U.S. Patent 3,252,267 to Myles for example, there is disclosed apparatus which utilize two pairs of fingers to stretch and expand an elastic bag about its periphery.

Generally, these apparatus employ a plurality of cantilevered stretching fingers over which an elastic, plastic bag is placed and subsequently expanded by the stretching fingers in order to form a passage through which an item can be advanced and placed in the bag. In these apparatus, two of the stretching fingers are fixedly secured while the other fingers are secured to horizontally displaced, mechanically actuated means. While operable, these apparatus are not entirely acceptable since the two pairs of fingers act only to stretch the bag in one direction. Because of this, the bag is not uniformly expanded so that greater stretching stresses are imparted over some portions of the bag while other portions are subjected to relatively less stretching stress. As a result, the portions of the bag subjected to greater stretching stress "thin out" and often break. To avoid this, bags having thicker walls are utilized giving rise to increased costs. Further, the passage formed by these stretching fingers does not permit alteration of the formed passage so that items having varying size and shape cannot be readily packaged therein. Additionally, since these apparatus stretch these bags in only one direction, any imprint thereon has a tendency to become distorted thereby reducing the sales appeal of the products encased in these bags.

In apparatus such as disclosed in U.S. Patent 2,946,166 to Baxter and U.S. Patent 2,885,850 to Smith, the items themselves are utilized to expand and stretch the elastic bags as they are inserted therein. If these items are food items which exhibit a degree of pliancy, the food item will be deformed when utilized to expand and stretch the elastic bag thereby giving rise to an undesirable and unsightly packaged item having reduced sales appeal.

If apparatus, such as those disclosed in U.S. Patent 2,843,984 to Dunning and U.S. Patent 2,884,328 to Johnson, are employed, an elastic, plastic bag having a high degree of elasticity must be employed since the fingers which expand the bag are relatively short. Because of this, the elastic, plastic bag must be closely gathered over the fingers and a high degree of force is required to expand the fingers and open the bag.

It is an object of the present invention, therefore, to provide an apparatus and method for uniformly stretching and expanding an elastic, memory-type, plastic bag about its defined periphery.

Another object of the present invention is to provide an apparatus and method for uniformly stretching and expanding an elastic, memory-type, plastic bag about its defined periphery and throughout its length so that items having different shapes and sizes can be inserted therein to obtain a packaged item wherein the walls of the elastic bag closely and uniformly adhere to the surface of the encased item.

These and further objects of the present invention will become more clear when considered in the light of the ensuing description thereof.

The objects of the present invention can be generally accomplished by providing packaging apparatus comprising, in combination, means for uniformly expanding and stretching an elastic, memory-type, plastic bag about its periphery and along its length; means for delivering an item into the thusly expanded elastic bag; and means for removing the thusly encased item together with the expanded plastic bag from said expanding means so that the elastic, plastic bag adheres closely and uniformly to the surfaces of the thusly encased item. The apparatus of the present invention also has associated therewith means for individually and sequentially delivering thereto a plurality of items to be packaged and means for accommodating the insertion in the elastic, plastic bags of items having various sizes and shapes.

The present invention will become more clear when taken together with the accompanying drawing which forms a part thereof and which is set forth as being merely illustrative and is not intended, in any way, to be limitative of the present invention and wherein;

FIG. 4 is a plan view, part broken away and part in phantom, of the apparatus of FIG. 1;

FIG. 5 is an end elevational view, part in section and part in phantom, taken through line 5—5 of FIG. 4;

FIG. 6 is an end elevational view, part in phantom, taken through line 6—6 of FIG. 4;

FIG. 7 is a side elevational view, part in section, taken through line 7—7 of FIG. 6; and FIG. 8 is a side elevational view, part in section and part broken away, illustrating another embodiment of the apparatus of the present invention.

Figure 1:
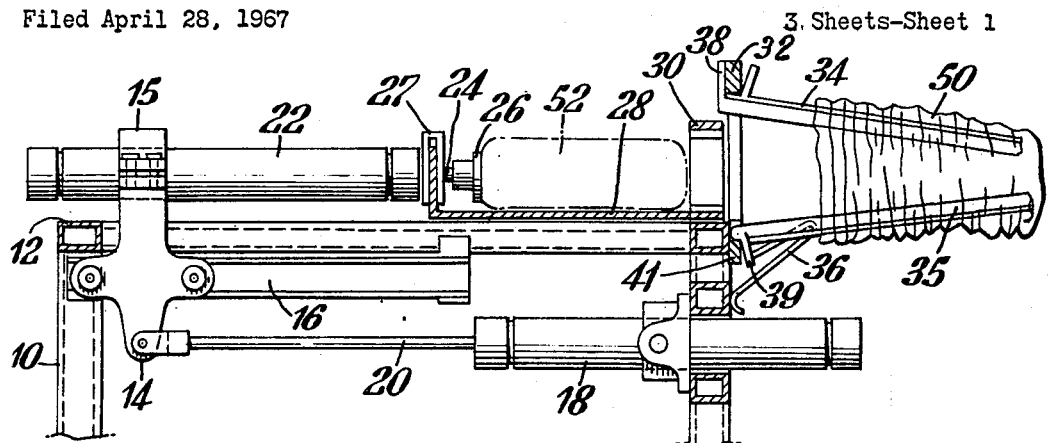
FIG. 1 is a side elevational view, part in section and part in phantom, illustrating one embodiment of the present invention.

Turning now to the drawing wherein like reference numerals denote like parts, there is shown in FIG. 1 a support frame generally designated by reference numeral 10 supporting a work surface 12. A slide rail 16 is fixedly secured beneath work surface 12 and a carriage 14 having an adjustable mounting collar 15 is slideably secured in slide rail 16. A lower pneumatic cylinder 18 is adjustably secured by conventional collar means to support frame 10. The piston rod 20 of pneumatic cylinder 18 is secured to the lower end of carriage 14. An upper pneumatic cylinder 22 is mounted within the adjustable mounting collar 15 of carriage 14. To the end of the cylinder rod 24 of upper pneumatic cylinder 22, there is mounted a product pusher 26. By means of a conventional, U-shaped, quick release clamp 27 one end of a product delivery trough 28 is secured to the cylinder rod end 24 of upper pneumatic cylinder 22. To the other end of product delivery trough 28, there is mounted a finger expanding ring means 30, which is utilized in conjunction with the delivery trough 28. Product delivery trough 28 can be fabricated as desired or required to accommodate food items of varying size and shape. Adjacent finger expanding ring means 30 there is fixedly secured to support frame 10, a finger support bracket 32. A plurality of expanding fingers, comprising in this embodiment of the present invention, a pair of L-shaped upper fingers 34 and a pair of L-shaped lower fingers 35, are pivotably secured to finger support bracket 32.

As seen more clearly in FIGS. 6 and 7, upper and lower expanding fingers 34, 35 are prefarbly mounted at a 45° angle with respect to an imaginary vertical axis drawn through their points of pivotal mounting to support bracket 32 so that the planar surfaces of diametrically disposed fingers face each other; that is, the planar surface of each of the upper fingers 34 are diametrically disposed opposite to a respectively disposed lower finger 35.

As illustrated in FIGS. 6 and 7, it can be seen that pivotably mounted upper fingers 34 are retained in a collapsed position by the force of gravity. To retain the pair of lower expanding fingers 35 in their collapsed position, each is equipped with a spring 36 mounted to support bracket 32 which spring is positioned to be in contact with the underside of lower fingers 35. The springs 36, act to urge lower expanding fingers upwardly and retain them in their collapsed position. The short legs 38 of upper expanding fingers 34 are positioned to contact finger support bracket 32 thereby limiting the angle of collapse of upper fingers 34 when finger expanding ring means 30 is in its retracted position. The short legs 39 of lower expanding fingers 35 are provided with an aperture formed therein which co-acts with an adjustable stop means 41 mounted in finger support bracket 32 (FIG. 7). Thus, the stop means 41 provides for regulation and control of the extent to which lower fingers 35 can be urged upwardly into their collapsed position. By this means, interference and intermingling of the upper and lower fingers with each other is prevented and avoided and each pair of fingers can be retained in their respective, collapsed but separated positions.

It will become apparent to those skilled in the art that other means can be employed to mount upper and lower expanding fingers 34, 35 to finger support bracket 32. For example, upper and lower expanding fingers 34, 35 can be fabricated without their short legs 38, 39, respectively. In place of short legs 38, 39, there can be formed a groove or channel in the mounting ends of upper and lower expanding fingers 34, 35. The groove or channel can be formed to have a pin inserted therein which can then provide the means by which upper and lower expanding fingers 34, 35 can be rotatably mounted in finger support bracket 32.

It will also become apparent to those skilled in the art, that upper and lower expanding fingers 34, 35 can be arranged on and mounted to support bracket 32 so that, upon being spread apart by the finger expanding ring means 30, they can uniformly define any required or desired peripheral configuration in the subsequently opened elastic, plastic bag 50.

As also shown in FIG. 1, an elastic, memory-type plastic bag, generally designated by reference numeral 50, is shown sheathed about and gathered along the upper and lower expanding fingers 34, 35 so that its closed end abuts the ends of upper and lower fingers 34, 35 and is thereby positioned substantially horizontal to and in alignment with product feed trough 28. A food item generally designated by reference numeral 52 (FIG. 2), is shown positioned in product feed trough 28.

Turning now to FIGS. 4 and 5, there is illustrated therein a product feed hopper, generally designated by reference numeral 40, which is utilized to stack and align food items for subsequent delivery to product delivery trough 28. Feed hopper 40 is equipped with a hinged loading gate 42 which is disposed generally parallelly and adjacent to product delivery through 28 and is actuated by means of a pneumatic cylinder 44 so that only one food item 52 at a time is delivered to and deposited in product trough 28.

Turning now to FIG. 8, there is illustrated another embodiment of the apparatus of the present invention which embodiment generally comprises a pair of pneumatic cylinders, one of which is telescoped within the other and each of which is equipped with its own piston rod. As shown in FIG. 8, an outer, primary pneumatic cylinder 60 is provided with a tubular piston rod 62 in which there is telescoped an inner, secondary pneumatic cylinder 64 equipped with its own cylinder rod 66, the piston surface of which is designated by reference numeral 59. A primary air conduit, generally designated by reference numeral 68, is connected to a suitable air supply source (not shown) and is utilized to advance the piston rod 62 of primary pneumatic cylinder 60. Mounted in the piston of primary cylinder 60 is a control valve 70 which, when sufficient air pressure has been attained, admits air under pressure from the primary conduit 68 to the secondary pneumatic cylinder 64 and thereby actuates cylinder rod 66. Another air conduit, generally designated by reference numeral 72 and connected to suitable air supply source (not shown), is provided for retracting piston rod 62 of outer, primary pneumatic cylinder 60. A port 74 is provided in piston rod 62 to retract cylinder rod 66 of the inner, secondary pneumatic cylinder 64. Also mounted in the piston of primary cylinder 60 is a check valve 71 which acts to permit air to be exhausted from secondary cylinder 64 through primary conduit 68 when piston rod 66 is retracted. Air conduits 68, 72 can be connected to a four-way valve equipped with an adjustable time-delay mechanism so that air conduit 68 can be pressurized while conduit 72 is exhausted and exhaust air conduit 68 when air conduit 72 is pressurized. By this means, the advancement and retraction of cylinders 60 and 64 can be controlled to predetermined operative and dwell time intervals.

A typical operation of the apparatus of the present invention will now be described and can be more readily understood when taken together with the accompanying drawing. Prior to start up, the hopper 40 (FIGS. 4 and 5) is loaded with a food item to be packaged and an elastic, memory-type, plastic bag 50 is sheathed over and about upper and lower expanding fingers 34, 35, with the closed end of plastic bag 50 abutted against the end of fingers 34, 35. A suitable finger expanding ring means 30 is then selected so that it will accommodate the passage therethrough of the range of the particular size and shape of food product to be packaged. While the configuration of the finger expanding ring means 30 employed is not critical, it is preferred that it be fabricated to have at least four lands positioned to contact each of the upper and lower expanding fingers 34, 35 and thereby spread them apart when the finger expanding ring means 30 is advanced therebetween. A typical finger expanding ring means configuration is illustrated in FIG. 5.

Lower pneumatic cylinder 18 is adjusted in support frame 10 so that the total stroke limit of its piston rod 20, when actuated, will insure complete delivery of a food product 52 within the stretched and expanded elastic, memory-type, plastic bag 50. Upper pneumatic cylinder 22 is also adjusted to insure that the full extent of the stroke of cylinder rod 24 will first advance the food item 52 through the finger expanding ring means 30 and completely insert the food item 52 to the bottom of the elastic bag 50, and then continue its stroke to remove the thusly packaged food item 52 and bag 50 from the apparatus.

Figure 2:
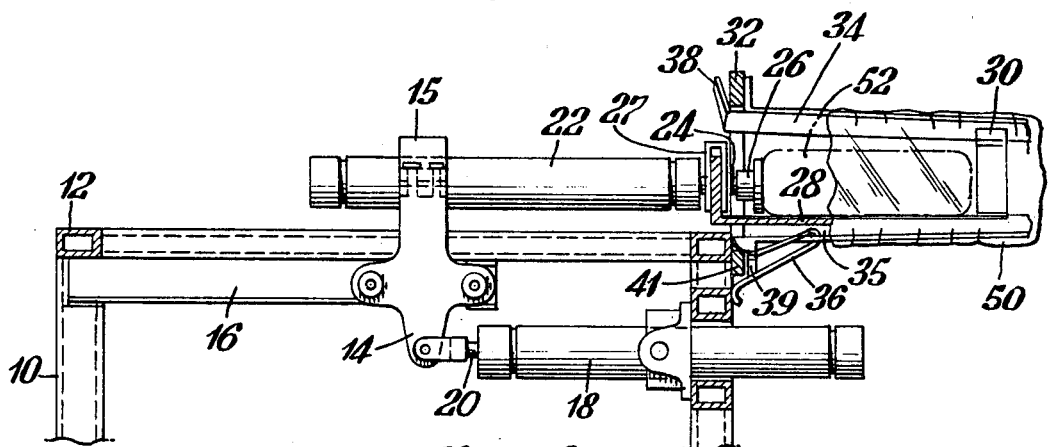
FIG. 2 depicts the apparatus of FIG. 1 in one operating position.

Upon start-up, pneumatic cylinder 44 is energized by conventional means thereby actuating hinged loading gate 42 enabling it to rotate and permit the delivery and positioning of a food item 52 in the product delivery trough 28. (FIGS. 1, 4 and 5.) By means of a conventional four-way valve (not shown) cylinder 44 is actuated, after a predetermined dwell period, to close gate 42 and thereby prevent another food item 52 from simultaneously entering the product delivery trough 28. Lower pneumatic cylinder 18 is now energized to advance upper pneumatic cylinder 22, product delivery trough 28 containing food product 52, and finger expansion ring means 30 into the previously positioned elastic, memory-type, plastic bag 50 and between upper and lower expanding fingers 34, 35 by traversing carriage 14 on slide rail 16 (FIG. 2). As it is being advanced into the elastic, plastic bag 50 and between expansion fingers 34, 35 the lands of finger expanding ring means 30 contact the inner, planar surfaces of the expanding fingers 34, 35 gradually spreading them apart thereby also stretching and expanding the elastic, plastic bag 50 uniformly about its defined perimeter and throughout its length as shown in FIG. 2.

In a preferred embodiment of the present invention, the finger expansion ring means 30 is advanced to a point short of the ends of the upper and lower expansion fingers 34, 35 but sufficient to permit the food item 52 to be easily and readily inserted into the expanded elastic, plastic bag 50. Next, upper pneumatic cylinder 22 is energized to advance its cylinder rod 24 to the full extent of its stroke limit, thereby pushing food item 52 out of product delivery trough 28 through finger expanding ring means 30 and into the stretched and expanded elastic, plastic bag 50 toward the closed end thereof by means of product pusher 26. Advance of cylinder rod 24 continues as the food item 52 contacts the closed end of elastic, plastic bag 50 and then pushes the elastic, plastic bag 50 and the food item 52 inserted therein off the fingers. In this manner, the elastic, plastic bag is caused to uniformly and closely adhere to the surfaces of the food item as the elastic, plastic bag tends to return to its initial dimension and a neatly packaged food item is obtained.

By means well known to those skilled in the art, any suitable device can be utilized to carry the thusly packaged food item away from the apparatus.

Return of the various components of the apparatus to their starting positions occurs in reverse, sequential order beginning first with the retraction of cylinder rod 24 into upper pneumatic cylinder 22 followed by retraction of product delivery trough 28 and finger expanding ring means 30. As finger expanding ring means 30 is retracted, upper and lower expanding fingers 34, 35 will return to their respective, collapsed positions, the upper expanding fingers 34 being returned by force of gravity and the lower expanding fingers 35 being returned by the urging of springs 36. Pneumatic cylinder 22 is now returned to its starting position upon actuation of lower pneumatic cylinder 18 advancing its piston rod 20 to the full extent of its stroke limit while cylinder 44 is also simultaneously energized to admit the next food item 52 to product delivery trough 28 as described hereinabove. The apparatus is now ready to begin another packaging cycle.

Figure 3:
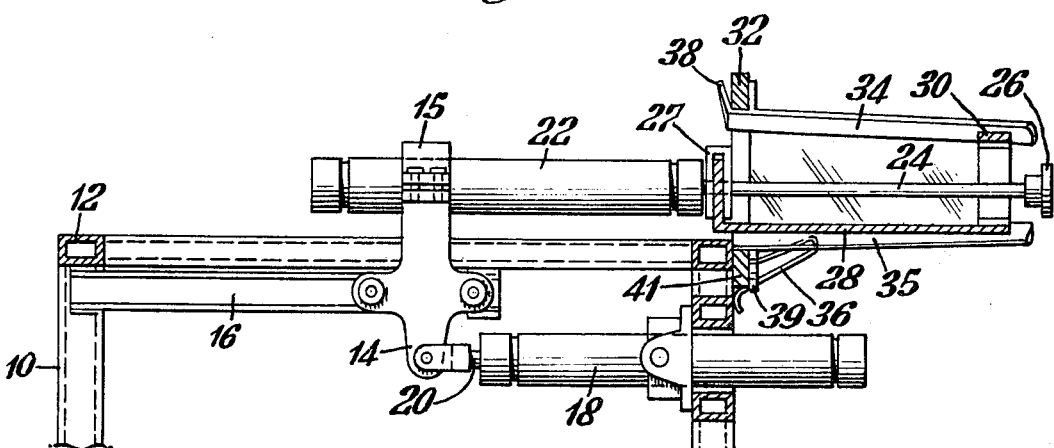
FIG. 3 depicts the apparatus of FIG. 1 in a further operating position.

With reference to FIG. 8 of the drawing, the operation of the embodiment depicted therein will now be described. After a food item 52 has been aligned and positioned in food product delivery trough 28 as described hereinabove, air under pressure is admitted through primary air conduit 68 to advance the tubular piston rod 62 of outer, primary pneumatic cylinder 60 to its full stroke limit. Advance of tubular piston rod 62 to its full stroke limit results in the positioning of the food item 52 carried by product delivery trough 28 into the previously positioned elastic, plastic bag 50 and, simultaneously, causes upper and lower expanding fingers 34, 35 to be spread apart by the advance of finger expanding ring means 30 attached to the end of product delivery trough 28 as shown in FIGS. 1–3. The air pressure in primary air conduit 68 is now permitted to increase to a point sufficient to overcome the retarding force of valve means 70. When this occurs, air under pressure is admitted through valve means 70 from primary air conduit 68, to act upon the piston surface 59 of cylinder rod 66 of inner, secondary pneumatic cylinder 64. Advance of cylinder rod 66 in this manner to the full extent of its stroke limit causes food item 52 to be pushed into the elastic, plastic bag 50 by means of the product pusher 26 and subsequently be removed from the apparatus as a packaged food item in the same manner as described hereinabove.

Valve means 70 is provided with an adjustment to regulate the pressure at which air is passed therethrough. By appropriate adjustment of valve 70, cylinder rod 66 can also be advanced during the same time that at least a part of piston rod 62 is being advanced.

Return of cylinder rod 66 and piston rod 62 to their starting positions is accomplished by admitting air under pressure into air conduit 72 and simultaneously exhausting air through conduit 68. When piston rod 62 has been returned to its starting position, air under pressure is admitted through port 74 opening check valve 71 and exhausting air through air conduit 68 thereby returning piston rod 66 of inner secondary cylinder 64 to its starting position. The apparatus is now ready to begin another packaging cycle.

In order to accommodate food items having varying, size and shape, and to control the extent to which the expanding fingers 34, 35 are opened by the finger expanding ring means 30, the apparatus depicted in FIG. 8 can be slideably mounted on the work surface 12 and fixedly secured at predetermined positions thereon by means well known to those skilled in the art.

The materials which can be employed to fabricate the various components of the apparatus of the present invention are not critical provided they are acceptable for use with food items. In a preferred embodiment of the present invention, however, the expanding fingers are fabricated from narrow, thin gauged, lightweight metals, metal alloys, or plastic materials, having a low coefficient of friction to facilitate removal therefrom of a previously stretched and expanded elastic, plastic bag.

It has been found that utilizing the apparatus of the present invention permits the use of elastic, plastic bags having relatively thinner walls thereby reducing bag costs. It has also been found that the manner in which the apparatus of the present invention functions results in little or no distortion of imprinted matter on the elastic, plastic bags giving rise to a product having better sales appeal.

While the present invention has been described in some detail and set forth with particularity, it should be understood that alterations, modifications and changes can be made therein without departing from the scope and spirit of the invention.

What is claimed:

1. An apparatus for packaging food items in elastic, plastic bags comprising, in combination:
    (a) means for stretching and expanding an elastic, plastic bag insertable through the open end of said bag;
    (b) a delivery means adapted to hold the food item to be packaged;
    (c) means associated with said delivery means and cooperable with said stretching and expanding means whereby said stretching and expanding means is actuated to open said elastic, plastic bag when said delivery means is advanced in the direction of the open end of said bag;
    (d) means for advancing said delivery means into the open end of said elastic, plastic bag; and
    (e) means for discharging said food item from said delivery means into the interior of said elastic, plastic bag while at the same time removing the filled bag from said stretching and expanding means, thereby causing said bag to closely and uniformly adhere to the surfaces of the food item.

2. An apparatus for packaging food items in elastic, plastic bags comprising, in combination:
    (a) means for stretching and expanding an elastic, plastic bag uniformly about its defined perimeter and throughout its length insertable through the open end of said bag;
    (b) a delivery means adapted to hold the food item to be packaged;
    (c) means for feeding food items of varying size and shape to said delivery means;
    (d) means associated with said delivery means and cooperable with said stretching and expanding means whereby said stretching and expanding means is actuated to open said elastic, plastic bag uniformly about its defined perimeter and throughout its length when said delivery means is advanced in the direction of the open end of said bag;
    (e) means for advancing said delivery means into the open end of said elastic, plastic bag; and
    (f) means for discharging said food item from said delivery means into the interior of said elastic, plastic bag while at the same time removing the filled bag from said stretching and expanding means, thereby causing said bag to closely and uniformly adhere to the surfaces of the food item.

3. The apparatus of claim 2 wherein the means for stretching and expanding said elastic, plastic bag uniformly about its defined perimeter and throughout its length comprises a plurality of expanding fingers insertable within the open end of said elastic, plastic bag.

4. The apparatus of claim 3 wherein the means associated with said delivery means for actuating said stretching and expanding means comprises a ring mounted on said delivery means and adapted to contact the plurality of expanding fingers to cause said fingers to expand and open said elastic, plastic bag uniformly about its defined perimeter and throughout its length.

5. The apparatus of claim 2 wherein the means for advancing said delivery means into the open end of said elastic, plastic bag comprises a first pneumatic cylinder.

6. The apparatus of claim 2 wherein the means for discharging said food item from said delivery means into the interior of said elastic, plastic bag comprises a pusher actuated by a second pneumatic cylinder.

7. The apparatus of claim 6 wherein said second pneumatic cylinder is telescopically mounted and positioned within said first pneumatic cylinder.

8. The apparatus of claim 2 wherein the means for feeding the food items of varying size and shape to said delivery means comprises a hopper equipped with a loading gate adapted to individually and sequentially supply the food items to said delivery means.

9. An apparatus for packaging food items in elastic, plastic bags comprising, in combination:
    (a) a support frame;
    (b) a plurality of expanding fingers mounted on said frame and insertable within an elastic, plastic bag;
    (c) a product delivery trough having a configuration fabricated to accommodate food items of varying size and shape to be packaged;
    (d) means for individually and sequentially feeding the food items to said produce delivery trough;
    (e) a first pneumatic cylinder mounted on said frame and operable to advance said product delivery trough into the open end of said bag;
    (f) an expanding ring mounted on said product delivery trough and having a configuration adapted to contact said expanding fingers and to cause said fingers to expand when said product delivery trough is advanced into said elastic, plastic bag, thereby causing said bag to be stretched and expanded uniformly about its defined perimeter and throughout its length; and
    (g) means for discharging said food item from said product delivery trough into the interior of said elastic, plastic bag while at the same time removing the filled bag from said expanding fingers, thereby causing said bag to closely and uniformly adhere to the surfaces of the food item.

10. The apparatus of claim 9 wherein the means for discharging said food item from said product delivery trough comprises a second pneumatic cylinder adjustably mounted and secured to said first pneumatic cylinder.

11. The apparatus of claim 9 wherein the means for discharging said food item from said product delivery trough comprises a second pneumatic cylinder telescopically mounted and positioned within said first pneumatic cylinder.

References Cited

UNITED STATES PATENTS 3,252,267   5/1966   Myles _____ 53—257

A. LOUIS MONACELL, Primary Examiner

W. BOVEE, Assistant Examiner

U.S. Cl. X.R.

99—171

PO-1050
(5/69)

UNITED STATES PATENT OFFICE
CERTIFICATE OF CORRECTION

Patent No. 3,503,180    Dated March 31, 1970

Inventor(s) M. J. Myles and J. P. Spellman

It is certified that error appears in the above-identified patent and that said Letters Patent are hereby corrected as shown below:

Column 1, lines 18, 20 and 21 "a method and" should be deleted; line 32, the word "in" should read --into--; line 51, the word "relased" should read --released--.

Column 2, lines 47 and 51, "and method" should be deleted.

Column 3, line 56, "prefarbly" should read --preferably--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents